United States Patent
Yu et al.

(10) Patent No.: US 10,110,517 B2
(45) Date of Patent: Oct. 23, 2018

(54) SYSTEM AND METHOD FOR OPEN VSWITCH VIRTUAL SWITCH THAT SUPPORTS IEEE 802.1P

(71) Applicant: SHENYANG INSTITUTE OF AUTOMATION OF THE CHINESE ACADEMY OF SCIENCES, Liaoning (CN)

(72) Inventors: Haibin Yu, Liaoning (CN); Peng Zeng, Liaoning (CN); Dong Li, Liaoning (CN); Xueting Yu, Liaoning (CN); Zhibo Li, Liaoning (CN); Jindi Liu, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 341 days.

(21) Appl. No.: 14/902,459

(22) PCT Filed: Dec. 30, 2014

(86) PCT No.: PCT/CN2014/095563
§ 371 (c)(1),
(2) Date: Dec. 31, 2015

(87) PCT Pub. No.: WO2016/082282
PCT Pub. Date: Jun. 2, 2016

(65) Prior Publication Data
US 2016/0301631 A1 Oct. 13, 2016

(30) Foreign Application Priority Data
Nov. 30, 2014 (CN) .......................... 2014 1 0714491

(51) Int. Cl.
*G06F 15/177* (2006.01)
*H04L 12/931* (2013.01)
(Continued)

(52) U.S. Cl.
CPC .............. *H04L 49/70* (2013.01); *H04L 41/08* (2013.01); *H04L 41/50* (2013.01); *H04L 47/24* (2013.01);
(Continued)

(58) Field of Classification Search
CPC .. H04L 41/08–41/0806; H04L 41/0813; H04L 41/0856; H04L 41/0893;
(Continued)

(56) References Cited

U.S. PATENT DOCUMENTS

2004/0081093 A1* 4/2004 Haddock ................. H04L 47/10
370/230
2012/0324442 A1* 12/2012 Barde ..................... H04L 49/70
718/1

(Continued)

FOREIGN PATENT DOCUMENTS

| CN | 102347894 A | 2/2012 |
| CN | 102868645 A | 1/2013 |
| CN | 103825823 A | 5/2014 |

*Primary Examiner* — Brendan Y Higa
(74) *Attorney, Agent, or Firm* — Novick, Kim & Lee, PLLC; Allen Xue

(57) ABSTRACT

The present invention discloses a method and system for realizing Open vSwitch that supports 802.1p. The method comprises: a priority mode configuration stage: the switch receiving a priority configuration statement of a user and parsing the configuration statement; a configuration storage stage: storing the parsed configuration information into a switch database; and a priority-based data forwarding stage: the switch putting a received data packet into a corresponding priority queue according to said configuration information and a flow table so as to forward the data packet. The (Continued)

system comprises a configuration module, a configuration information storage module and a priority-based forwarding module, wherein the data priority-based forwarding module comprises a configuration reading unit, a traffic control setting unit, a flow table storage unit, a data packet parsing unit, a flow table matching unit, a flow table executing unit, a scheduling unit, priority queues, a sending unit, etc.

4 Claims, 6 Drawing Sheets

(51) Int. Cl.
*H04L 12/24* (2006.01)
*H04L 29/06* (2006.01)
*H04L 12/851* (2013.01)
*H04L 12/891* (2013.01)
*H04L 12/861* (2013.01)

(52) U.S. Cl.
CPC ...... *H04L 47/2433* (2013.01); *H04L 47/2441* (2013.01); *H04L 47/2483* (2013.01); *H04L 47/41* (2013.01); *H04L 49/90* (2013.01); *H04L 69/22* (2013.01)

(58) Field of Classification Search
CPC .... H04L 45/586; H04L 47/22–47/2441; H04L 47/2483–47/2491; H04L 47/41; H04L 47/50; H04L 49/70; H04L 49/90
See application file for complete search history.

(56) References Cited

U.S. PATENT DOCUMENTS

2014/0156818 A1* 6/2014 Hunt ................... H04L 63/0407
709/222
2014/0201738 A1* 7/2014 Choi ................... G06F 9/45533
718/1

* cited by examiner

SYSTEM AND METHOD FOR OPEN VSWITCH VIRTUAL SWITCH THAT SUPPORTS IEEE 802.1P

TECHNICAL FIELD

The present invention relates to the technical field of networks, in particular to a system and method for Open vSwitch virtual switch that supports IEEE 802.1p.

BACKGROUND

A software defined network (SDN) is now a novel network innovative architecture. Because the firmware of a traditional network device (switch and router) is locked and managed by a device manufacturer, SDN hopes to separate network management from physical network topology so as to release the network architecture from the limit of the hardware. In this way, a user can modify the network architecture like upgrading and installing software to meet the requirement of adjusting, expanding or upgrading the entire network architecture for enterprises. However, the underlying device on the data layer, such as hardware of switch, router, etc., does not need to be replaced, thereby greatly shortening the iteration cycle of the network architecture while saving much cost, so as to provide a good platform for innovation of core networks and applications.

Open vSwitch is an open virtual switch, completely supports the SDN architecture based on openflow protocol, and is an industry-recognized virtual switch which is the most mainstream for SDN. It is a product-quality multilayer virtual switching standard under the Apache 2.0 license. Open vSwitch has lower cost and higher working efficiency compared with a physical switch. One virtual switch can have dozens of ports to connect a virtual machine, while Open vSwitch itself occupies very small resources. The user can conduct flexible configuration according to his preference, and can receive and analyze a data packet.

Open vSwitch provides a traffic control function, but currently only supports htb mode and hfsc mode. For some occasions having real-time data transmission requirement, it is difficult for the two traffic control modes supported currently to meet the requirement. For example, a profinet network and an IEC61850 network widely used currently require the connected switch to support 802.1p, i.e., to forward the data packet based on the priority according to the information carried by pcp byte in an MAC layer of the data packet. Therefore, to enhance the traffic control function of Open vSwitch and to apply Open vSwitch to more occasions (e.g., in an industrial network), a priority-based forwarding mode for traffic control shall be added so as to support 802.1p for increasing the forwarding real-time performance of Open vSwitch.

SUMMARY

In view of this, the present invention provides a method and system for realizing Open vSwitch that supports 802.1p. By increasing priority-based traffic control mode for priority-based forwarding, 802.1p can be supported, the forwarding real-time performance of Open vSwitch is enhanced and application occasions of an openflow network are extended.

To realize the above-mentioned purposes, the present invention discloses the technical solution: A method for realizing Open vSwitch that supports 802.1p comprises the following steps:

a priority mode configuration stage: the switch receiving a priority configuration statement of a user and parsing the priority configuration statement to obtain configuration information;

a configuration storage stage: storing the configuration information into a switch database; and a priority-based data forwarding stage: the switch putting a received data packet into a corresponding priority queue according to the configuration information and a flow table so as to forward the data packet.

The priority configuration statement is:

the configuration statement has the format: command+object+attribute=value;

The configuration method is:

setting a qos name of a port;

establishing a qos mode of the qos name and a subqueue name; and establishing a subqueue.

The configuration information comprises:

ID, Type, Other-config and Queues;

and the ID is the qos name.

The data priority-based forwarding stage comprises the following steps:

after starting the switch, reading the configuration information in the switch database for configuring the qos mode of traffic control module of a switch port as a priority mode and setting a priority queue;

when receiving the data, the switch parsing the data, extracting key information in each layer of a data frame and matching with flow table entries; if succeeding in matching, putting the key information into a queue designated by action in the flow table entry; and the traffic control module of the switch sending the data according to the priority of the queue: first sending the data in a high-priority queue; and then sending the data in a low-priority queue after all the data in the high-priority queue is sent.

A system for Open vSwitch that supports 802.1p comprises:

a configuration module used for receiving configuration statements of the user for a traffic control mode and a parameter of Open vSwitch, parsing the configuration statements and storing parsed key information into a configuration information storage module for a data priority-based forwarding module to invoke;

a configuration information storage module used for storing the configuration information of the user for Open vSwitch flow; and a data priority-based forwarding module used for parsing the received data packet, extracting key information, matching the extracted key information with a header field of the flow table, and when succeeding in matching, executing according to the action in the flow table and putting the data packet into a designated output queue; and a scheduling unit forwards the output queue based on the priority.

The configuration module comprises:

a configuration interface unit used for the user to interact with Open vSwitch: on one hand, used for receiving configuration commands of the user, and also used for the user for information return of query commands;

a configuration parsing unit used for parsing and extracting the configuration commands inputted by the user; and a configuration storage unit used for storing user configuration information parsed and extracted by the configuration parsing unit.

The data priority-based forwarding module comprises:

a configuration reading unit used for reading related configuration information from the configuration storage module;

a traffic control setting unit used for setting a scheduling mode and a parameter of a traffic control scheduling unit according to the configuration information read by the configuration reading unit;

a flow table storage unit used for storing the flow table entries;

a data packet parsing unit used for parsing the data packet received by Open vSwitch and extracting the key information of the data packet;

a flow table matching unit used for matching the key information of the data packet extracted by the data packet parsing unit with header fields of all flow table entries in the flow table storage unit; if there are matched flow table entries, a flow table executing unit conducts processing; if not, the key information is sent to an openflow controller in accordance with an openflow protocol;

a flow table executing unit used for operating the data packet according to the designated action of the flow table entry and putting the data packet into a designated priority queue to wait for the scheduling unit for scheduling;

a traffic control scheduling unit used for arranging the data packets in the priority queues in a sending sequence according to the priority: first sending the data packets in the high-priority queue and then sending the data packets in the low-priority queue after the data packets in the high-priority queue are sent;

a priority queue unit used for caching the data packets of various priorities, wherein different priority queues represent different priorities and the data packets in the same priority queue are arranged in first-in first-out sequence; and a sending unit used for sending the data packets from the switch port in the sending sequence of the data packets scheduled by said scheduling unit.

It is known from the above technical solution that compared with the prior art, the present invention discloses a method and system for realizing Open vSwitch that supports 802.1p. The method comprises: a priority mode configuration stage: the switch receiving a priority configuration statement of a user and parsing the configuration statement; a configuration storage stage: storing the parsed configuration information into a switch database; and a priority-based data forwarding stage: the switch putting a received data packet into a corresponding priority queue according to the configuration information and a flow table so as to forward the data packet based on the priority. In the method, the traffic control function for priority-based forwarding is added for Open vSwitch so that Open vSwitch can support 802.1p, so the forwarding real-time performance of Open vSwitch is enhanced, application occasions of an openflow network are extended and the problem that the existing Openflow network cannot be applied in industrial networks of Profinet, IEC61850, etc. is solved.

DETAILED DESCRIPTION

The technical solutions in the embodiments of the present invention will be clearly and fully described below with combination of the drawings in the embodiments of the present invention. Obviously, the described embodiments are merely part of the embodiments of the present invention, not all of the embodiments. Based on the embodiments in the present invention, all other embodiments obtained by those skilled in the art without contributing creative labor will belong to the protection scope of the present invention.

It should be noted that the usage scope of the present invention is based on all software Openflow of linux kernel, not limited to Open vSwitch. Considering the predominance of Open vSwitch in software Openflow switch, the present invention is described herein in detail on the basis of realizing in Open vSwitch, but the method of the present invention also applies to other software Openflow switches of linux kernel.

Figure 1:
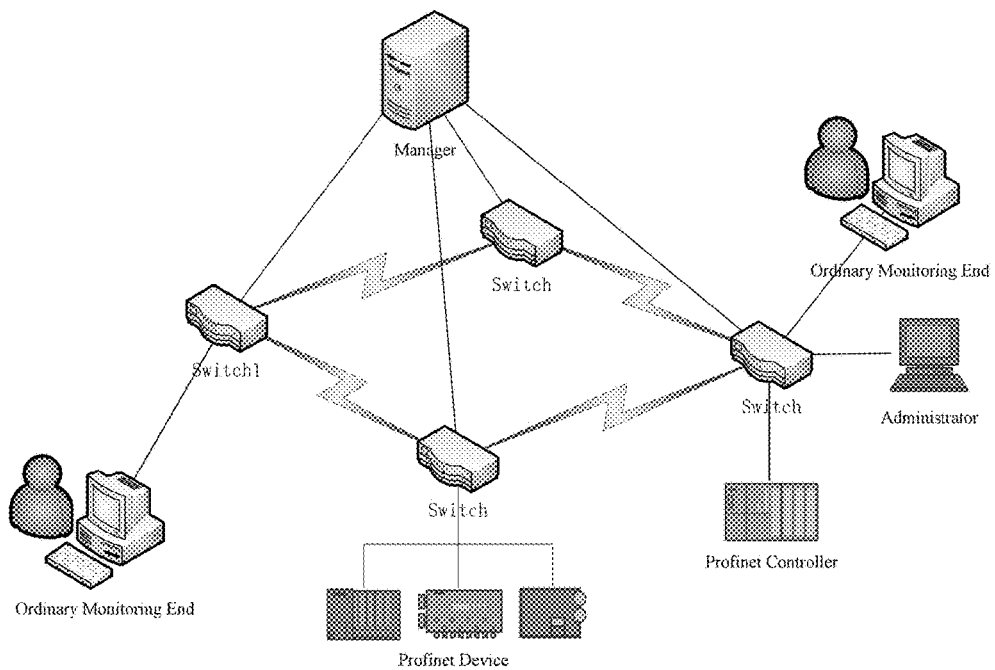
FIG. 1 is a schematic diagram of one embodiment of Open vSwitch of the present invention in Profinet industrial network deployment.

Referring to FIG. 1, a schematic diagram of one embodiment of Open vSwitch of the present invention in Profinet industrial network deployment is shown, and the entire network system is divide into two layers: a management layer and a data layer. The management layer consists of one or a plurality of distributed managers and is responsible for managing data layer devices in a management field and formulating a flow table; and the data layer consists of a plurality of Open vSwitches and terminal devices, wherein Open vSwitch receives the flow table of the manager and operates the data according to the flow table. The terminal devices can be ordinary terminals, such as PC, wherein transmitted data is standard TCP/IP data, or industrial control devices, such as Profinet device and Profinet controller, wherein real-time data is Ethernet data with 802.1p and the switch needs to support 802.1p forwarding.

Figure 2A:
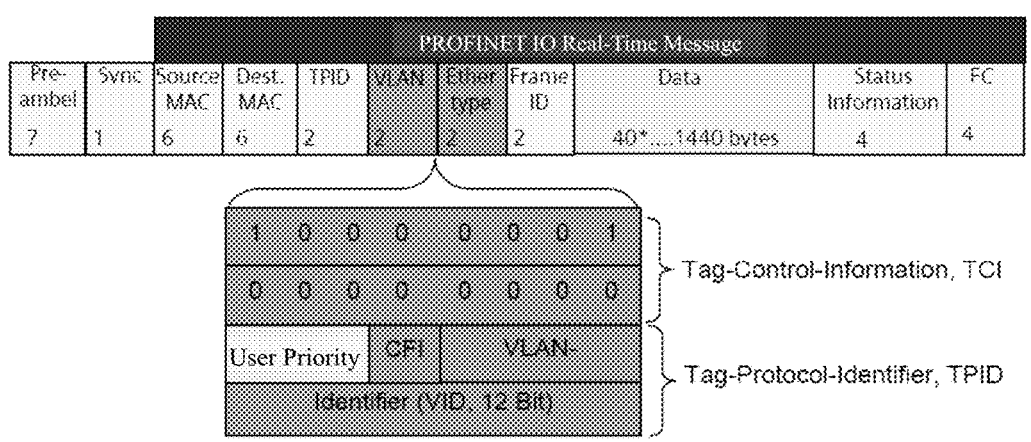
FIG. 2a is a schematic diagram of a protocol frame format of 802.1p of the present invention.

Referring to FIG. 2a, a schematic diagram of a protocol frame format of 802.1p is shown. IEEE 802.1P is IEEE 802.1Q (VLAN tagging technology) standard extension protocol. Both of them are operated so that the second-layer network switch can provide a flow priority service.

802.1Q defines a new Ethernet frame field which is added behind a source MAC of the Ethernet frame and in front of a length/type field. 802.1Q encapsulating includes four bytes, containing two parts: TPID (Etype) and Tag Control Info;

TPID: It is 2 bytes long, fixed at 0x8100; the encapsulating type of identification messages is 802.1Q encapsulating of Ethernet;

TCI: It contains three parts: user priority, CFI and VLAN-ID;

User priority (PCP): 3 bits show the frame priorities. There are 8 priorities ranging from 0 to 7, mainly used for preferably sending high-priority data packets by identifying the priority through the switch when congestion occurs in switch egress ports.

CFI: In the Ethernet switch, a normative format indicator is always set as 0. Due to the compatibility, CFI is often used between Ethernet network and token ring network. If the frame received in an Ethernet port has CFI, the indicator is set as 1, indicating that the frame is not forwarded because the Ethernet port is a no-tag port.

VID: VLAN ID is an identification field of VLAN and is often used in standard 802.1Q. The field is 12 bits and supports the identification of 4096 (2^12) VLAN. In possible VID of 4096, VID=0 is used for identifying the frame priorities and 4095 (FFF) is used as a reserved value, so the possible maximum value configured for VLAN is 4094.

In this way, under the support of IEEE802.1p, a host of a user terminal can request the priority of submitted flow, sets a corresponding mark in bits of PCP on a frame header, gives a higher priority to real-time application (for example, PCP of Profinet real-time data is 6) and gives a lower priority to ordinary application (for example, PCP of background communication data is 1 or 2) for supporting QoS of all kinds of services on Ethernet.

Figure 2B:
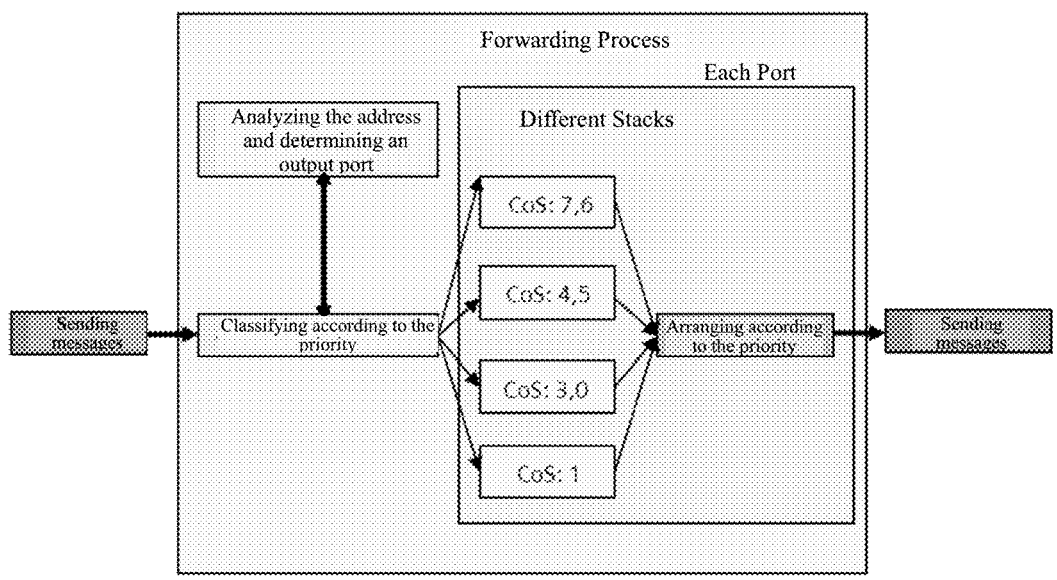
FIG. 2b is a schematic diagram of a switch forwarding principle that supports 802.1p in the present invention.
Figure 4:
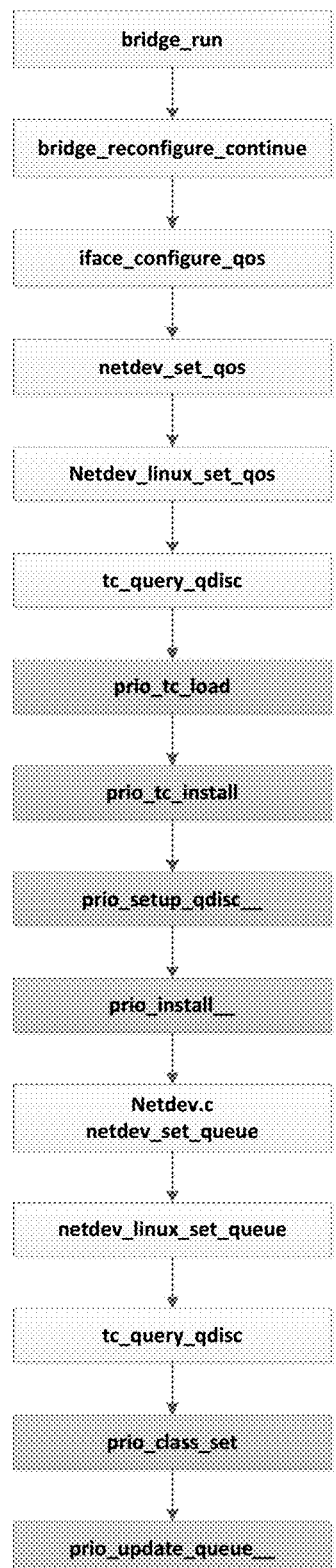
FIG. 4 is a flow diagram of invoking a priority-based forwarding interface of Open vSwitch that supports 802.1p in the present invention.

Referring to FIG. 2b, a schematic diagram of a switch forwarding principle that supports 802.1p is shown. An ordinary switch that supports 802.1p sets different stacks (queues) for each port. There are 8 priorities supported by 802.1p, but actually the number of stacks of the switch is determined by the priorities supported. In FIG. 2b, 4 priorities are supported, so the switch has four stacks. After receiving the data, the switch parses the data and classifies the data in two steps: the first step: searching an MAC address table and a routing table through source address and destination address to determine an output port of the data; the second step: determining the priority of the data packets through bits of PCP of 802.1p and putting the data packets into a corresponding stack of the output port (determined in the first step) according to the priority. When sending, a priority scheduler for traffic control will first send the data in the high-priority queue, and then send the data in the low-priority queue in sequence after the data in the high-priority queue is sent.

Open vSwitch supports openflow protocol. Therefore, the output port of the data packets and the corresponding queue (stack) are determined once by searching the flow table. Because Open vSwitch does not support the priority queue and scheduling, even if the PCP priority of 802.1p can be identified, priority-based forwarding cannot be conducted in accordance with the PCP priority. Therefore, the present invention adds a priority-based forwarding function for Open vSwitch so that Open vSwitch can support 802.1p.

Figure 3:
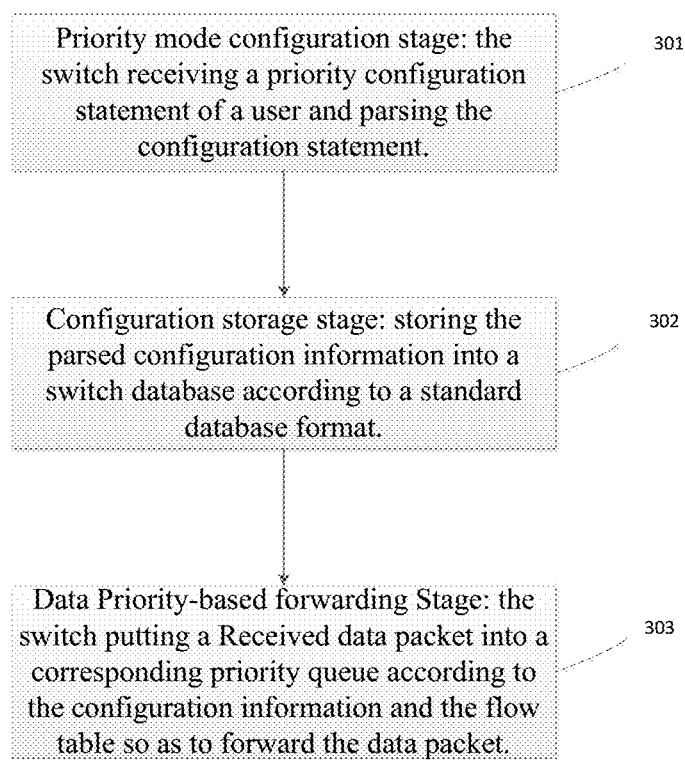
FIG. 3 is a flow diagram of one embodiment of a method for realizing Open vSwitch that supports 802.1p in the present invention.

Referring to FIG. 3, a flow diagram of one embodiment of a method for realizing Open vSwitch that supports 802.1p in the present invention is shown. The method comprises:

Step 301: a priority mode configuration stage: the switch receiving a priority configuration statement of a user and parsing the configuration statement.

Wherein an ovs-vsctl configuration tool is usually used for user configuration of Open vSwitch. The tool can be used for configuring various functional parameters of the switch including traffic control modes of htb and hfsc. A general configuration statement configured by using the ovs-vsctl tool has the following format:

ovs-vsctl [options]—[options] command [args] [—[options] command [args]] . . .

Because Open vSwitch itself does not support a priority traffic control mode, if the configuration of the traffic control mode is added, the ovs-vsctl configuration tool shall be modified so as to support the identification and the parsing of the configuration statement in the priority traffic control mode. The format and the method of the priority configuration statement designed in the present invention are as follows:

The priority configuration statement has the format:
command+object+attribute=value.
The configuration method is:
setting a qos name of a port;
establishing a qos mode of the qos name and a subqueue name; and
establishing a subqueue.
For example, a typical configuration is as follows:

```
#ovs-vsctl set port eth1 qos=@newqos \
-- --id=@newqos create qos type=linux-prio
queues=0=@q0,1=@q1, 2=@q2\
-- --id=@q0 create queue \
-- --id=@q1 create queue \
-- --id=@q2 create queue \
```

Parsing the configuration statement and extracting configuration information which comprises: ID (qos name), Type, Other-config and Queues, and storing the configuration information in accordance with a structure format of qos parameter in the ovs-vsctl tool, as follows:

```
struct ovsrec_qos {
    struct ovsdb_idl_row header_;
    /* external_ids column. */
    struct smap external_ids;
    /* other_config column. */
    struct smap other_config;
    /* queues column. */
    int64_t *key_queues;
    struct ovsrec_queue * *value_queues;
    size _t n_queues;
    /* type column. */
    char *type; /* Always nonnull. */
};
```

Step 302: a configuration storage stage: storing the parsed configuration information into a switch database.

In the configuration storage process, the database of Open vSwitch itself is adopted for the storage process without special modification. The partial content is not the main job of the present invention and therefore, will not be described in detail herein. See Open vSwitch Database for the detailed process.

Step 303: a priority-based data forwarding stage: the switch putting a received data packet into a corresponding priority queue according to the configuration information and a flow table so as to forward the data packet.

Wherein after starting the switch, reading the configuration information in the database for configuring the qos mode of a traffic control module of a switch port as a priority mode and setting a priority queue. Because Open vSwitch itself does not support the priority mode, a configuration interface function of the priority mode shall be added in order to set the configuration information, configured previously into the database by a user, into the traffic control module and to forward the data in the priority mode.

Specifically, the priority interface data structure and the interface function of the traffic control module designed in the present invention are as follows:

```
static const struct tc_ops tc_ops_prio = {
"prio",                  /* linux_name */
"linux-prio",            /* ovs_name */
PRIO_N_QUEUES,           /* n_queues */
prio_tc_install,
prio_tc_load,
prio_tc_destroy,
prio_qdisc_get,
prio_qdisc_set,
prio_class_get,
prio_class_set,
prio_class_delete,
prio_class_get_stats,
prio_class_dump_stats
};
```

To describe the invoking process of the configuration interface function, the process of one typical prio_tc_install of the interface function is taken as an example to describe the invoking process of the interface function, as shown in FIG. 4. After Open vSwitch is started, the qos of a network device (i.e., switch port) is set by invoking a qos setting function netdev_set_qos of a netdev layer. In netdev_set_qos, an interface function Netdev_linux_set_qos of netdev layer and linux layer is invoked. In Netdev_linux_set_qos, a corresponding interface function can be searched according to the traffic control mode which is set as the priority mode herein. Therefore, the interface function of the priority mode can be invoked, namely setting prio_tc_install.

After the traffic control mode and the parameter are set, when receiving the data, the switch parses the received data, extracts key information in each layer of a data frame and matches with flow table entries. If succeeding in matching, the switch puts the key information into a queue designated by action in the flow table entry.

Wherein it should be noted that the flow table of Openflow protocol include three fields: a header field, counters and actions. Openflow 1.0 version specifies that the header field comprises 12 tuples: a data ingress port, an MAC source address, an MAC destination address, an Ethernet frame type, Vlan ID, PCP, an IP source address, an IP destination address, an IP protocol type, IP Tos, a TCP/UDP source port and TCP/UDP destination port. These tuples contain features of each layer of the data packet and are keys for identifying the data packet. Counters are used for data statistics. Actions show the operation of the data matched with the header field.

Key information of each layer of the data frame comprises a data ingress port, an MAC source address, an MAC destination address, an Ethernet frame type, Vlan ID, PCP, an IP source address, an IP destination address, an IP protocol type, IP Tos, a TCP/UDP source port and TCP/UDP destination port which are the same as tuples of the header field of the flow table. The switch compares the key information extracted from each layer of the data frame with the header entries of all flow table entries in the switch. If they are identical, matching is successful. The switch can operate in accordance with the action contents of the matched flow table entries. If it is forwarding operation, the switch sends the data packet into a designated queue of a designated port, and the data then waits for the scheduling of the traffic control module. If there is no flow table entry identical with the key information of the data packet, matching is considered to fail. The switch can send the data packet to an openflow manager for processing.

After the data packet is put into a corresponding priority queue by the action of the flow table, the traffic control scheduling unit of the switch sends the data according to the priority of the queues: first sends the data in the high-priority queue; and then sends the data in the low-priority queue after all the data in the high-priority queue is sent.

Figure 5:
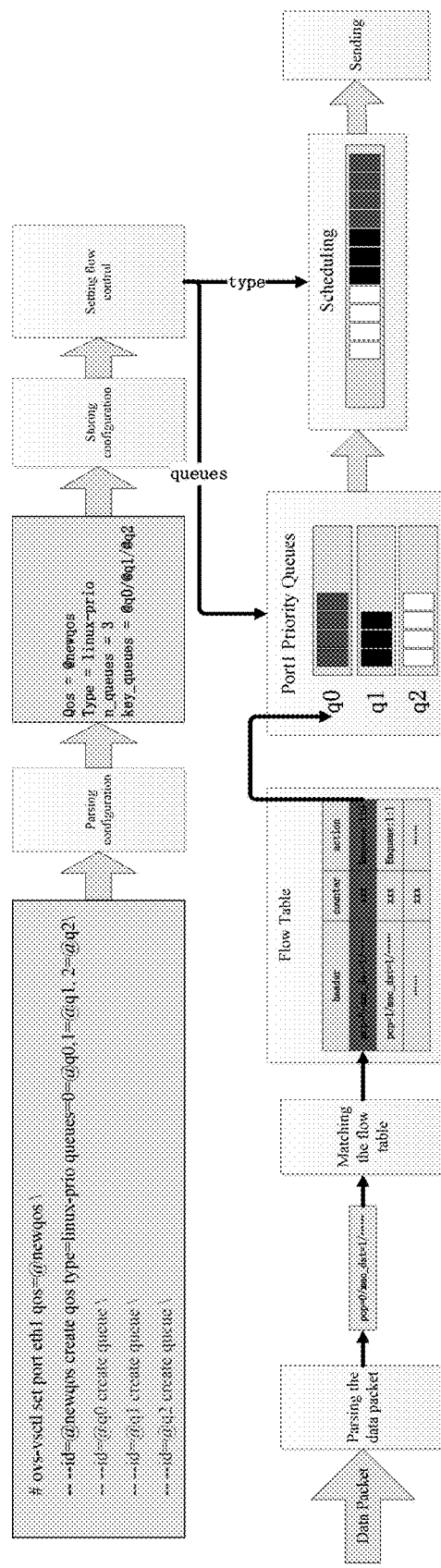
FIG. 5 is a schematic diagram of one embodiment of a method for realizing Open vSwitch that supports 802.1p in the present invention.

To clearly introduce a priority forward configuration that supports 802.1p, a forwarding method and a process in the present invention, a concrete application scenario will be presented below in detail. Referring to FIG. 5, a schematic diagram of one embodiment of a method for realizing Open vSwitch that supports 802.1p is shown.

In the scenario of the schematic diagram of the embodiment, the ovs-vsctl tool is used by the user for inputting the configuration statement to configure qos for the eth1 port of Open vSwitch.

```
#ovs-vsctl set port eth1 qos=@newqos \
-- --id=@newqos create qos type=linux-prio
    queues=0=@q0,1=@q1, 2=@q2\
-- --id=@q0 create queue \
-- --id=@q1 create queue \
-- --id=@q2 create queue \
```

The configuration statement sets the qos name of eth1 port as @newqos, and then sets @newqos, i.e., qos type of eth1, as linux-prio. Here linux-prio indicates the priority mode and comprises three priority queues: No. 0 (queue name: @q0), No. 1 (queue name: @q1) and No. 2 (queue name: @q2).

Then, the configuration parsing unit parses the inputted configuration statement into struct ovsrec_qos identified by Open vSwitch and stores it into the ovs database.

After the switch is started, the qos configuration in the ovs database is automatically read and reset into struct ovsrec_qos type. The traffic control setting unit sets the scheduling mode of the scheduler as prio mode according to information priority queues (including three queues herein: respectively q0, q1 and q2) in struct ovsrec_qos.

After some data enters the switch, the data packet parsing unit parses the data packet, extracts the information of the input port, the MAC source address, the MAC destination address, PCP, VLAN, etc. of the data packet and matches the information with the header field of each table entry stored in the flow table.

After the flow table entries matched therewith are found, execute in accordance with the action content of the flow table entry. Herein, the action content is Enqueue: 1: 0, indicating that the data packet is outputted into the queue with the port of 1 and the queue number of 0, i.e., q0. The switch puts the data packet into a cache of the q0 to wait for the scheduler for scheduling.

When scheduling, the scheduler first reads the data packets in the high-priority queue, namely that sends the data packets in q0, and reads and sends the data packets in q1 and q2 after all the data packets in q0 are sent so as to finish the function of the priority traffic control mode.

Figure 6:
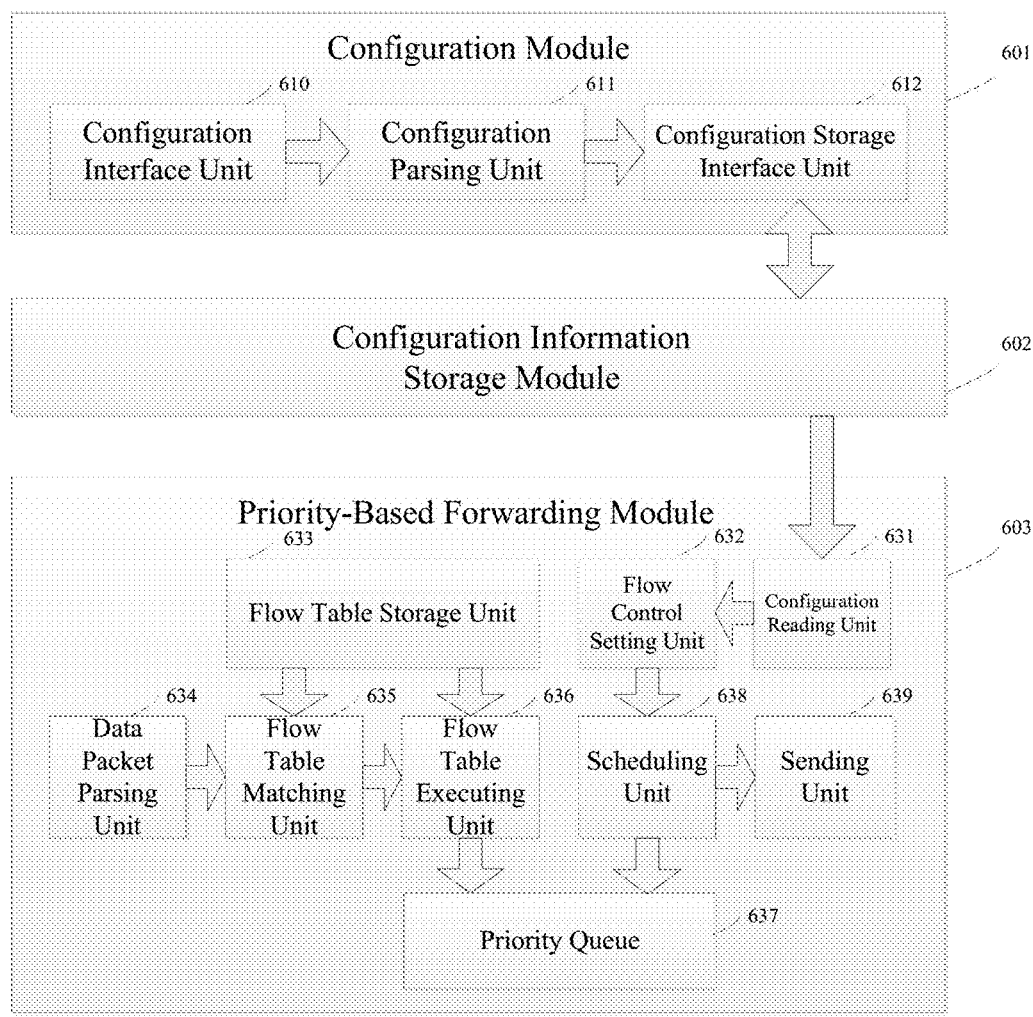
FIG. 6 is a structural diagram of one embodiment of a system for Open vSwitch that supports 802.1p in the present invention.

Corresponding to the method of the present invention, with reference to FIG. 6, a structural diagram of one embodiment of a system for Open vSwitch that supports 802.1p in the present invention is shown. The system comprises: a configuration module 601, a configuration information storage module 602 and a data priority-based forwarding module 603.

In the embodiment, the configuration module 601 is used for receiving configuration statements of the user for the traffic control mode and the parameter of Open vSwitch, parsing the configuration statements and storing parsed key information into a configuration information storage module for the priority-based forwarding module to invoke, comprising the concrete steps:

The configuration interface unit 610 is used for the user to interact with Open vSwitch: on one hand, used for receiving configuration commands of the user, and also used for the user for information return of query commands.

The configuration parsing unit 611 is used for parsing and extracting the configuration commands inputted by the user.

The configuration storage unit 612 is used for storing the user configuration information parsed and extracted into the configuration information storage module.

Correspondingly, in the embodiment, the configuration information storage module 602 is used for storing the configuration information of the user for Open vSwitch flow.

Correspondingly, in the embodiment, the data priority-based forwarding module 603 is used for parsing the received data packet, extracting key information, matching the extracted key information with a header field of the flow table, and when succeeding in matching, executing according to the action in the flow table entry and putting the data packet into a designated output queue; and the scheduling unit forwards the output queue based on the priority mode, specifically comprising:

The configuration reading unit 631 is used for reading related configuration information from the configuration storage module. Specifically, the configuration information comprises a set port number, the traffic control mode of the port, the port parameter, the number of queues, queue names, queue parameters, etc. This kind of information stored in the database is transformed into the structure identified by Open vSwitch and inputted into the traffic control setting unit.

The traffic control setting unit 632 is used for setting the scheduling mode of the traffic control scheduling unit and the parameter of the priority queue unit according to the configuration information read by the configuration reading unit. At this moment, the priority queue unit generates priority queues of which the number corresponds to the number of configuration queues, and the scheduling unit is also set as the priority scheduling mode to get ready for data priority-based forwarding.

The flow table storage unit 633 is used for storing the flow table entries. The contents of the flow table storage unit belong to the technical category of openflow protocol specifications, and will not be described as the invention point of the present invention.

The data packet parsing unit 634 is used for parsing the data packet received by Open vSwitch and extracting the key information of the data packet. The partial content belongs to the technical category of openflow protocol specifications, and will not be described as the invention point of the present invention.

The flow table matching unit 635 is used for matching the key information of the data packet extracted by the data packet parsing unit with header fields of all flow table entries in the flow table storage unit; if there are matched flow table entries, a flow table executing unit conducts processing; if not, the key information is sent to an openflow controller in accordance with an openflow protocol. The partial content belongs to the technical category of openflow protocol specifications, and will not be described as the invention point of the present invention.

The flow table executing unit 636 is used for operating the data packet according to the designated action of the flow table entry and putting the data packet into a designated priority queue of a designated port of the action to wait for the scheduling unit for scheduling.

The scheduling unit 637 is used for arranging the data packets in the priority queues in a sending sequence according to the priority: first sending the data packets in the high-priority queue and then sending the data packets in the low-priority queue after the data packets in the high-priority queue are sent.

The priority queue unit 638 is used for caching the data packets of various priorities, wherein different priority queues represent different priorities and the data packets in the same priority queue are arranged in first-in first-out sequence.

Specifically, the number of the priority queues in the priority queue unit is designated by the user when configuring the priority parameters, from a minimum of 2 priority queues to a maximum of 16 priority queues. When 802.1p is completely supported, the number of the priority queues is 8.

The sending unit 639 is used for sending the data packets from the switch port in the sending sequence of the data packets scheduled by the scheduling unit.

Each embodiment in the description is described in a progressive way. The difference of each embodiment from other embodiments is the focus of explanation. The same and similar parts among all of the embodiments can be referred to each other.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A method for realizing Open vSwitch that supports 802.1p, comprising:
    a priority mode configuration stage, wherein a switch receives a priority configuration statement of a user and parses the priority configuration statement to obtain configuration information;
    a configuration storage stage, wherein the configuration information is stored in a switch database; and
    a priority-based data forwarding stage, wherein the switch puts a data packet received from a source into a priority queue according to the configuration information and a flow table so as to forward the data packet,
    wherein the priority configuration statement has a format: command+object+attribute=value, and
    wherein a method for configuring the priority configuration statement comprises:
    setting a QoS name of a switch port;
    establishing a QoS mode of the QoS name and a subqueue name; and
    establishing a subqueue.

2. The method according to claim 1, wherein the configuration information comprises
    ID, Type, Other-config, and Queues,
    and the ID is the QoS name.

3. The method according to claim 1, wherein the priority configuration stage comprises reading the configuration information in the switch database for configuring the QoS mode of a traffic control module of the switch port as a priority mode and setting the priority queue.

4. The method according to claim 1, wherein the priority-based data forwarding stage comprises first sending the data in a high-priority queue; and then sending the data in a low-priority queue after all the data in the high-priority queue is sent.

\* \* \* \* \*